April 27, 1937. H. L. JOHNSTON 2,078,497

FOOD HANDLING APPARATUS

Filed June 25, 1934

INVENTOR
Herbert L. Johnston
BY
Maréchal + Noe
ATTORNEY

Patented Apr. 27, 1937

2,078,497

UNITED STATES PATENT OFFICE 2,078,497

FOOD HANDLING APPARATUS

Herbert L. Johnston, Troy, Ohio, assignor to The Hobart Manufacturing Company, Troy, Ohio, a corporation of Ohio Application June 25, 1934, Serial No. 732,227

2 Claims. (Cl. 220—1)

This invention relates to coffee grinders, and more particularly to a container adapted to hold the ground coffee.

The roasted coffee bean comprises a hard exterior portion and a thin, membrane-like center which is quite different in physical properties from the hard exterior part. The membrane is folded in, but does not adhere tightly to the exterior part, and if the bean is cracked the two materials may be easily separated.

In the customary grinding of coffee, the bean is ground between metal burrs. The hard friable part of the bean breaks up readily, and can be reduced to any desired degree of granulation. The thin membrane-like portion has a tendency to slip edgewise between the burrs and to come out in relatively large thin flakes. This latter material is usually called chaff, although it is an important component of the coffee and its presence not only adds volume to the ground coffee, but is also useful to some extent in controlling the flavor of the coffee. It also performs a useful function particularly in the drip method of making coffee where the chaff tends to form a filtration bed through which the boiling water seeps and which effectively prevents passage of the granulated portions.

When the coffee is ground into a receiving can of the usual character, having a capacity materially in excess of the quantity of coffee ground, the granulated particles of coffee being relatively heavy fall to the bottom, but the light flakes of chaff tend to become electrified as a result of the frictional forces produced by the grinding burrs, and are attracted to the walls of the container to which they cling, coating the walls of the container above the layer of ground coffee. Then when the receiving container is emptied into the customer's receptacle, the heavier granulated coffee falls out first, leaving the chaff in large part clinging to the upper walls and the top of the receiving container. In order to entirely discharge the contents of the container into the customer's receptacle, it is customary to tap the container to jar out the remainder of the coffee, and this tapping loosens the chaff which falls out in a mass on top of the ground coffee. Not only does this produce an unattractive appearance on the top of the quantity of ground coffee, but it produces an uneven distribution of the chaff which is highly undesirable. The characteristics of the ground coffee as regards flavor, filtering tendency, etc., should be homogeneous throughout the entire quantity thereof for the most satisfactory results.

It is a principal object of the present invention to provide a container for receiving ground coffee in which an undesirable segregation of chaff and ground bean does not occur.

It is a further object to provide a container of such character that upon the discharge of the ground coffee from the container, the coffee itself is effective to sweep out the container and to produce the desired homogeneous intermixture of chaff and ground bean.

Other objects and advantages will be apparent from the following description, the accompanying drawing, and the appended claims.

In the drawing,—

Figure 1:
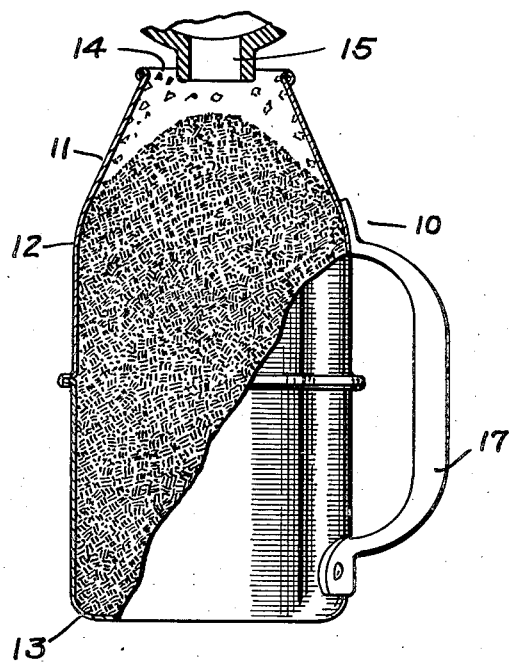
Fig. 1 is a view in side elevation of a device constructed in accordance with the present invention with a part of the container wall broken away to show the position occupied by the ground coffee when the container is filled.
Figure 3:
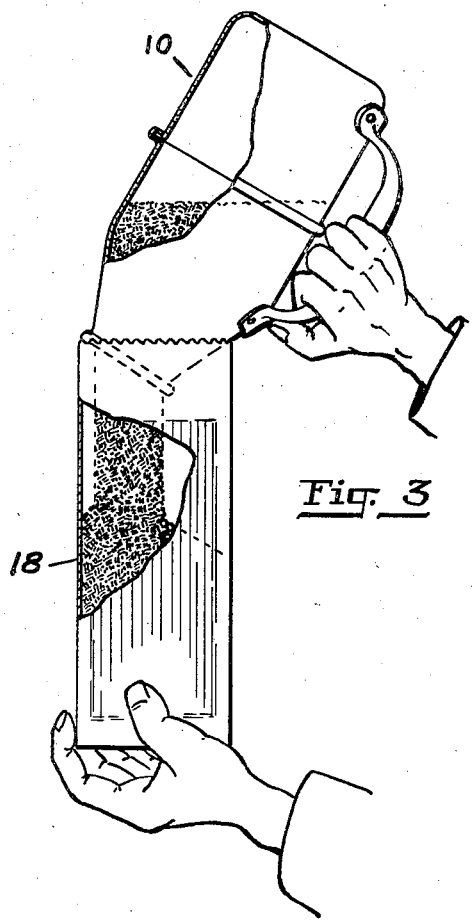
Fig. 3 shows the discharge of the receiving container into the consumer's receptacle.
Figure 2:
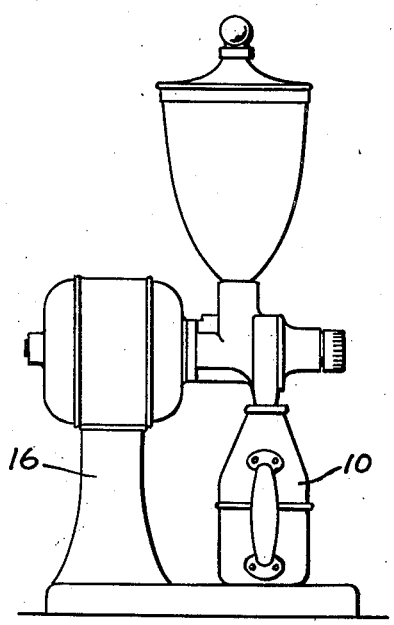
Fig. 2 shows a coffee mill of conventional design with the receiving container in place to receive the coffee as ground.

Referring to the drawing, which discloses a preferred embodiment of the invention, the container as a whole is designated by reference numeral 10. The container is spun or pressed from sheet metal, is generally cylindrical in shape, and the top is inwardly tapered in as shown at 11, to provide a neck portion having sloping sides making an angle of approximately 24° with the vertical, a slope of this order having been found to produce very satisfactory results. The neck portion preferably merges into the cylindrical portion as shown at 12, and the bottom is formed with a rounded corner 13, to provide a smooth inner surface, free of obstructions and recesses. The opening 14 of the container is restricted and is only slightly larger than the discharge spout 15 of the grinding mill 16, with which the container is to be used. A handle 17 is positioned at one side of the container.

The proportions of the container are preferably substantially those shown in Fig. 1 wherein the height of the container is about twice its diameter. The capacity of the container is coordinated with the quantity of coffee to be ground, so that it is made to have a predetermined small capacity in excess of the amount of coffee to be ground. Thus for example if one pound customer receptacles 18 are to be filled, the container 10 should be of such capacity that when holding the full pound of ground coffee, the coffee reaches practically to the top of the container. A slight excess of capacity is provided as indicated in Fig. 1, to prevent escape of the coffee from the container as a result of the air currents usually issuing from the discharge of the mill.

The operation of the device is as follows. A quantity of coffee in bean form is placed in the mill, and the container 10 is placed under the discharge spout of the mill. The coffee is ground into the container, the capacity of the container being so coordinated with the quantity of coffee being ground that when the coffee is fully ground and received, it approaches the top of the container leaving only a small portion of the container unfilled. Such chaff as settles on the container walls is covered by the ground coffee as it piles up and because of the sloping character of the neck portion of the container 11, and the quite limited extent of uncovered container wall, only a relatively small quantity of the chaff tends to attach itself to such wall above the ground coffee.

The container is then inverted and the coffee is dumped into the consumer's receptacle 18 which may be the same receptacle that originally contained the coffee in bean form. As the container is inverted the coffee completely fills the curved portion 11, and while running out through the restricted discharge opening tends to sweep over the entire inner wall of the container and to sweep out such chaff as has precipitated on the container walls. Thereby the chaff along the sides of the container is again distributed into the body of the coffee and is not permitted to become segregated. The small quantity of chaff attached to the uncovered wall portion 11 above the ground coffee is likewise scraped off and is effectively distributed throughout the remainder of the coffee as it is dumped into the receptacle 18 so that no objectionable segregation occurs. After the coffee has been emptied from the container 10, the container may be tapped to discharge the last particles, the chaff having been already incorporated into the ground coffee.

The invention therefore provides a very simple construction which assures that the desired homogeneous character of the ground coffee will be maintained in substantially the manner in which the constituents were present in the coffee bean.

While the article herein described constitutes the preferred embodiment of the invention, it is to be understood that the invention is not limited to this precise article, and that changes may be made therein without departing from the scope of the invention which is defined in the appended claims.

What is claimed is:

1. In food handling apparatus of the character described for receiving ground coffee from a coffee mill and adapted to discharge a substantially homogeneous intermixture of the chaff and ground bean, a combined receiver and dispenser comprising walls at least the upper part of which constitute a frusto-conical section terminating at its upper end in a combined receiving and discharge opening, the said receiver having a capacity which is coordinated with a predetermined quantity of ground coffee to be received therein such that it will be substantially filled by such quantity, the slope of the inwardly tapering walls of the conical section and the size of the said opening being so chosen that when the receiver is filled with ground coffee and is inverted to discharge its contents, the latter will move outwardly along and in sweeping contact with substantially all of the interior surface of the receiver to thereby dislodge and entrain chaff adhering thereto, whereby the discharged contents of the receiver comprise a substantially homogeneous intermixture of the chaff and ground coffee bean.

2. A container for use as a combined receiver and dispenser for ground coffee including the ground bean and chaff discharged from a coffee mill and adapted to maintain and to discharge a substantially homogeneous intermixture of the chaff and ground bean, said container comprising a body portion of generally cylindrical shape having walls presenting interior surfaces that are smooth and substantially free of obstructions or recesses, the upper part of said walls defining a frusto-conical section formed with a predetermined limited taper towards a single restricted opening constituting both an inlet and a discharge opening for the ground material, said restricted opening being of size to receive the discharge spout of a coffee mill and large enough to permit continuous and uninterrupted discharge of the contents of the container in its inverted position at a rate of discharge that is determined by the taper of the frusto-conical part of the container, the said container having a capacity coordinated with a predetermined quantity of ground coffee to be received therein such that said quantity will substantially fill the container and closely approach said restricted opening, the slope of the said taper portion of the container being of the order of 24° from the vertical and of such extent that, when the filled container is inverted for discharge of its contents, the conical upper section in cooperation with the said restricted opening will so regulate the discharge of the container contents that the latter will move along and in contact with the interior walls of the container to sweep substantially the entire interior surface in order to dislodge and entrain any chaff adhering thereto, and thus effect the discharge of a substantially homogeneous intermixture of the chaff and ground bean.

HERBERT L. JOHNSTON.